July 19, 1960  S. J. BECK  2,945,454
UNIVERSAL SKATE
Filed Feb. 20, 1956  6 Sheets-Sheet 1
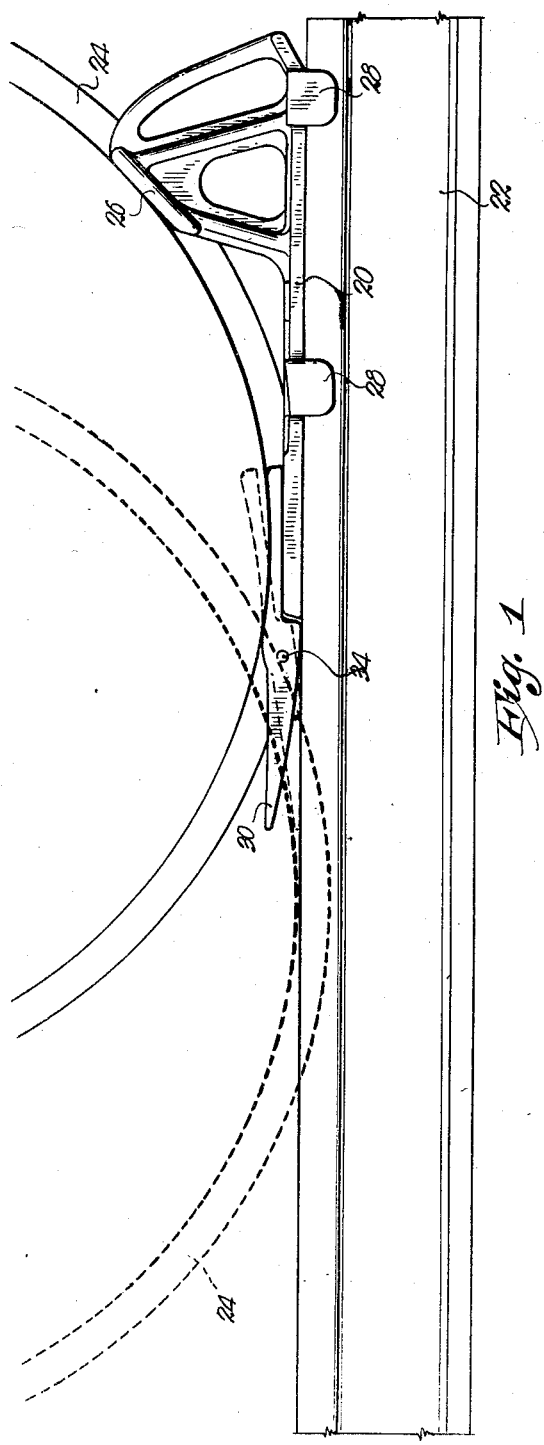
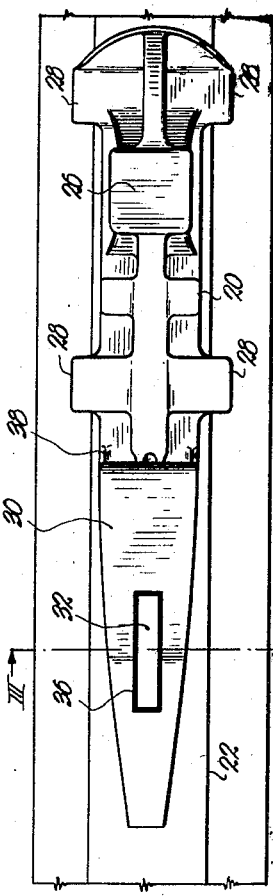
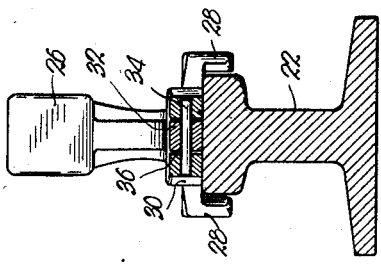
INVENTOR.
Samuel Jones Beck
BY
ATTORNEY.

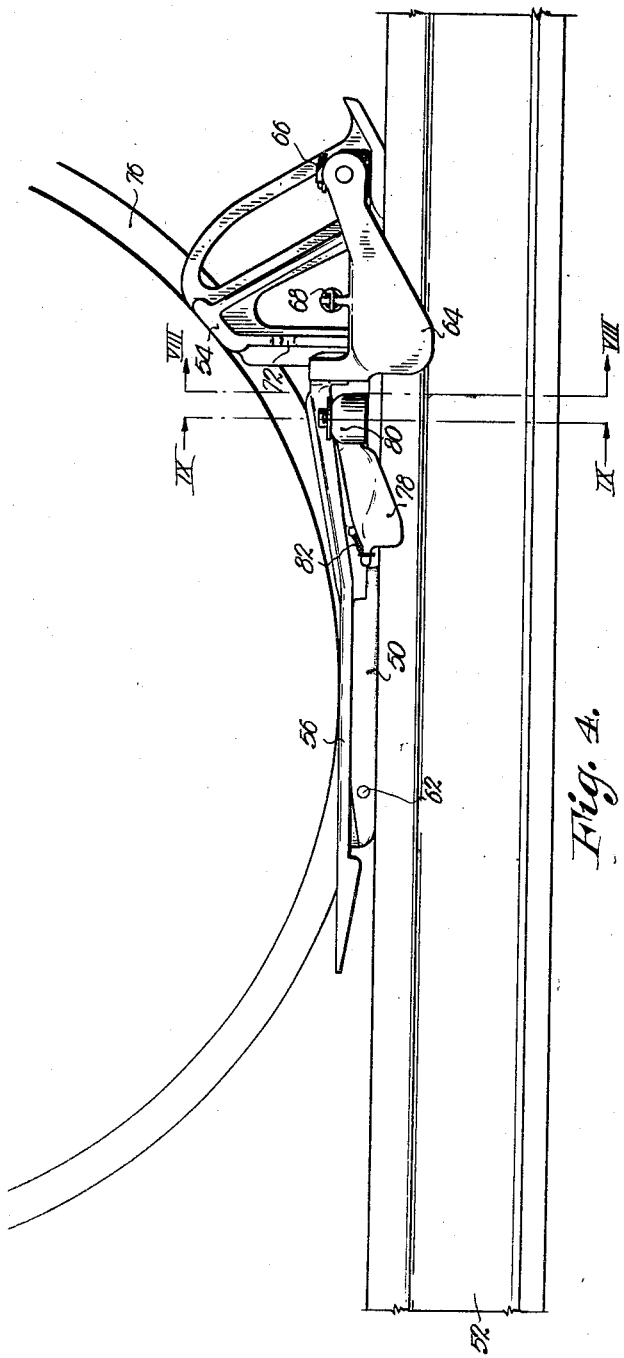

July 19, 1960
S. J. BECK
2,945,454
UNIVERSAL SKATE
Filed Feb. 20, 1956
6 Sheets-Sheet 3
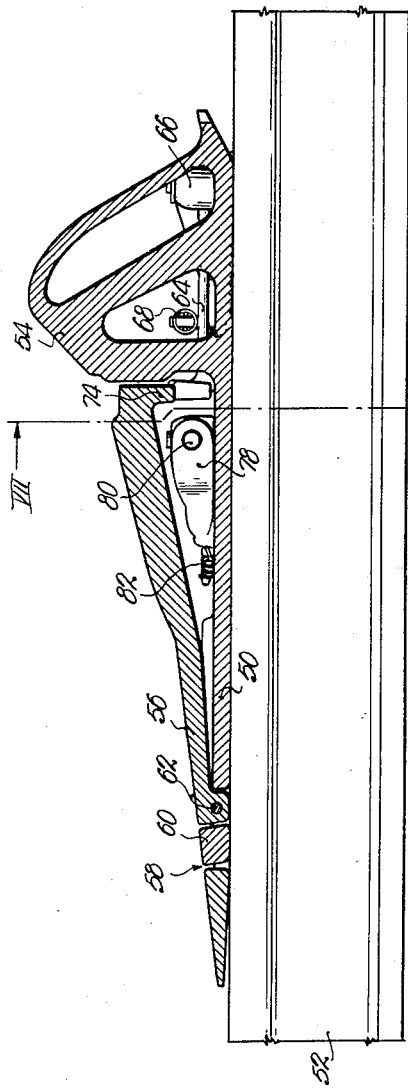
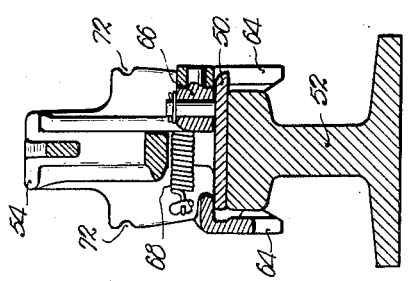
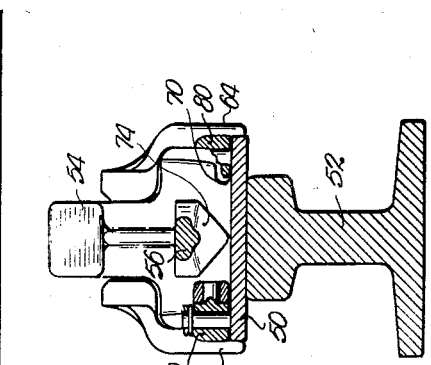
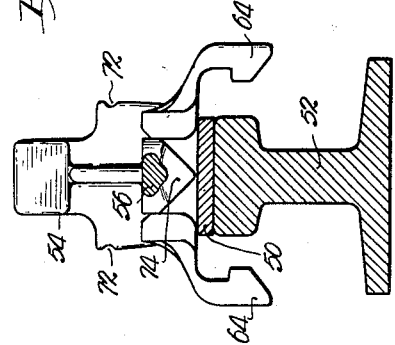
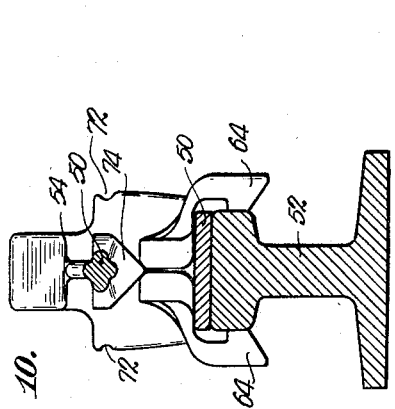
INVENTOR.
Samuel Jones Beck
BY
ATTORNEY.

July 19, 1960
S. J. BECK
2,945,454
UNIVERSAL SKATE
Filed Feb. 20, 1956
6 Sheets-Sheet 4
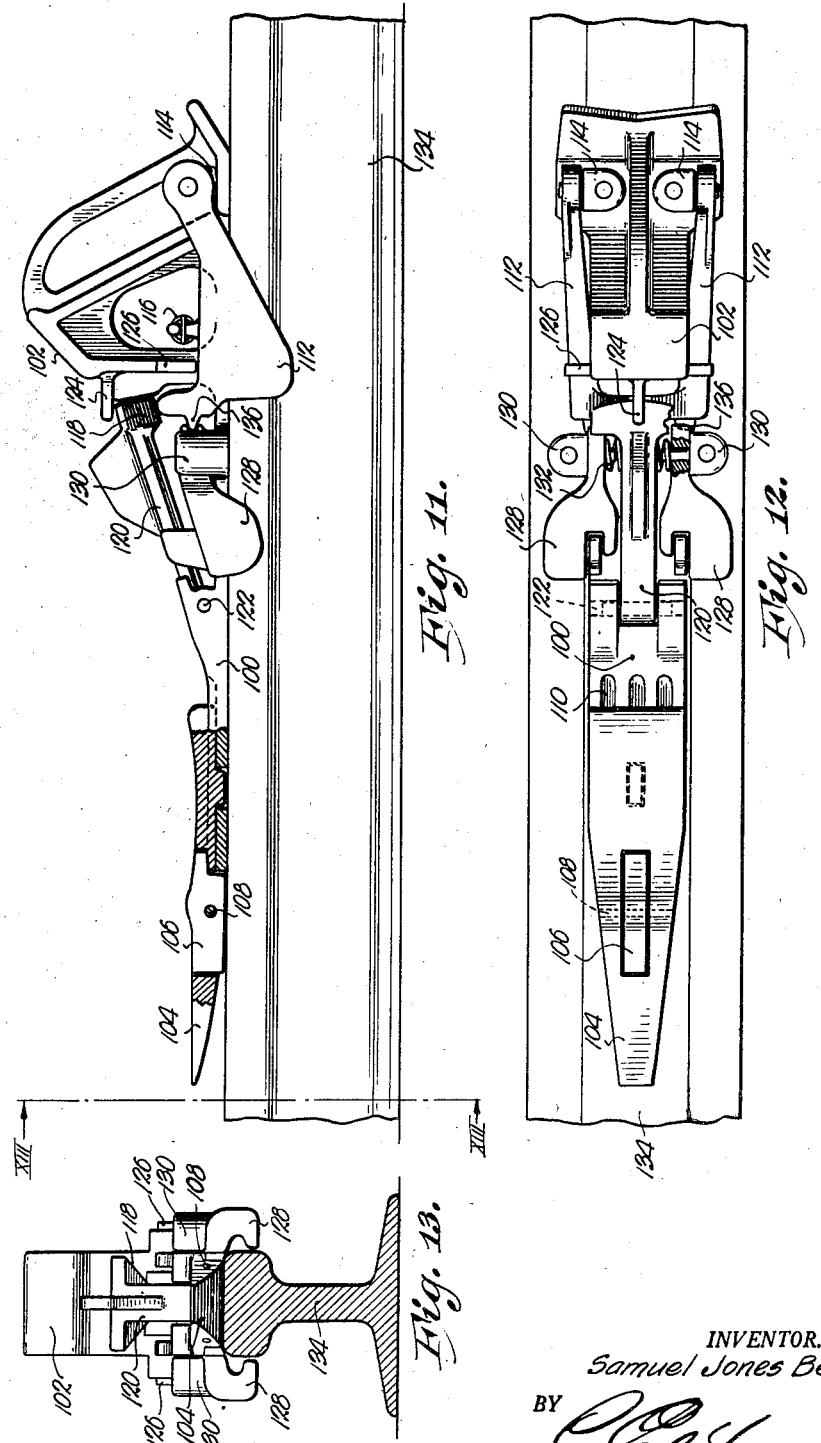
INVENTOR.
Samuel Jones Beck
BY
ATTORNEY.

July 19, 1960 S. J. BECK 2,945,454
UNIVERSAL SKATE
Filed Feb. 20, 1956 6 Sheets-Sheet 5
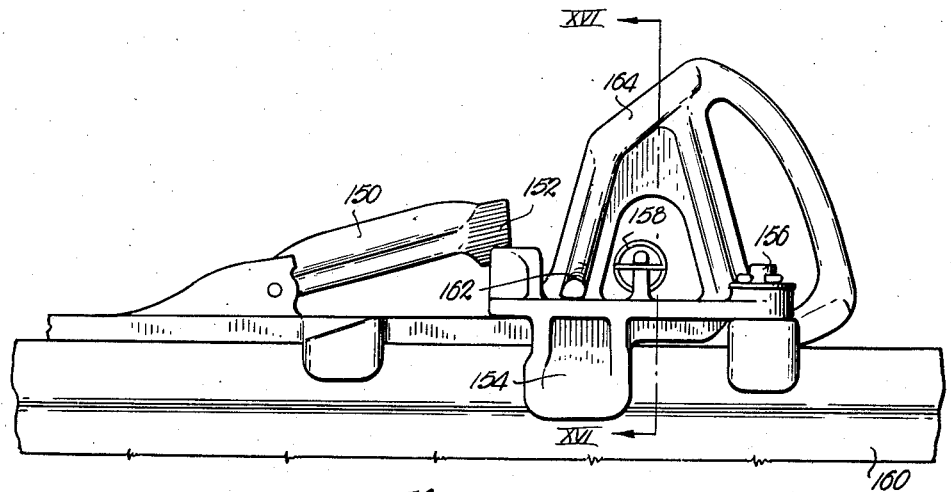
Fig. 14.
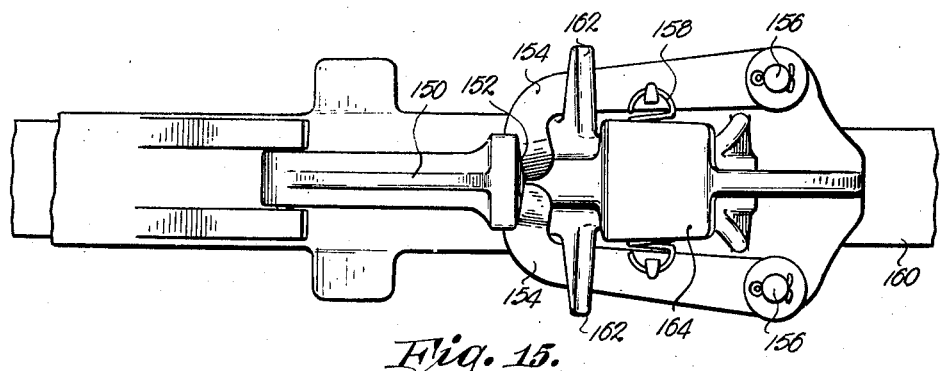
Fig. 15.
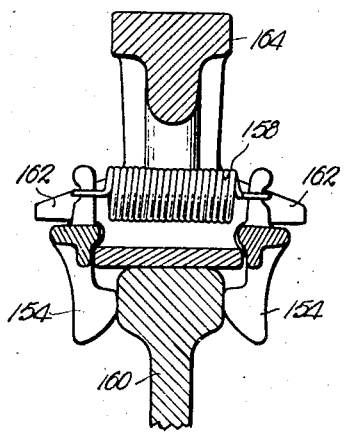
Fig. 16.
INVENTOR.
Samuel Jones Beck
BY
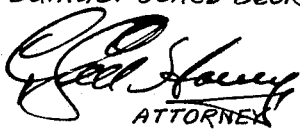
ATTORNEY July 19, 1960 S. J. BECK 2,945,454
UNIVERSAL SKATE Filed Feb. 20, 1956 6 Sheets-Sheet 6

INVENTOR.
Samuel Jones Beck
BY
ATTORNEY.

United States Patent Office 2,945,454
Patented July 19, 1960

2,945,454

UNIVERSAL SKATE

Samuel Jones Beck, Kansas City, Kans., assignor, by mesne assignments, to Clem W. Fairchild, trustee, Kansas City, Mo.

Filed Feb. 20, 1956, Ser. No. 566,407

7 Claims. (Cl. 104—259)

This invention relates to improvements in railway skates, namely, devices placed upon the rails for braking railway cars to a stop by virtue of sliding the skate along the rail with the car wheel carried thereby.

It is the primary object of the instant invention to provide a skate that is long-lasting by virtue of the fact that the ramp or tongue portion thereof for receiving the wheel and guiding the same to a position resting on the skate, is held by the wheel out of sliding engagement with the track and further, by virtue of the fact that the said tongue receives little heat because of the manner in which heat from the sliding bar is dissipated.

The most important object of the present invention is to provide a railway skate that cradles the wheel in a manner to prevent roll-back, thereby reducing the danger of the skate being thrown from the track and assuring positively that the skate will not be moved along the rail without the wheel actually resting properly thereon.

An important object of the present invention is to provide a railway skate having movable jaws for clamping the same to the rail, together with novel wheel-actuated means for opening the jaws and thereby releasing the skate as a consequence solely of the wheel moving to a position upon the skate with the weight thereof resting upon the jaw-opening mechanism.

A further object of the present invention is the provision of a railway skate having the aforementioned jaws mounted not only for horizontal movement to and from a clamping position, but vertically as the same move into engagement with frogs and other abutments, obstacles or projections along the railway track, so that damage to such rail equipment, as well as to the skate itself, is eliminated and the skate is not thrown from the track or the car itself derailed.

In the drawings:

Figure 1 is a side elevational view of a universal skate made according to one form of my present invention.

Fig. 2 is a plan view thereof.

Fig. 3 is a cross-sectional view taken on line III—III of Fig. 2.

Fig. 4 is a side elevational view of another form of railway skate made according to the instant invention.

Fig. 5 is a top plan view thereof.

Fig. 6 is a cross-sectional view taken on line VI—VI of Fig. 5.

Fig. 7 is a cross-sectional view taken on line VII—VII of Fig. 6.

Fig. 8 is a cross-sectional view taken on line VIII—VIII of Fig. 4 showing the primary clamping jaws released.

Fig. 9 is a cross-sectional view taken on line IX—IX of Fig. 4 showing the primary clamping jaws raised.

Fig. 10 is a cross-sectional view taken on irregular line X—X of Fig. 5.

Fig. 11 is a side elevational view of another embodiment of the instant invention, parts being broken away and in section to reveal details of construction.

Fig. 12 is a plan view thereof.

Fig. 13 is a cross-sectional view taken on line XIII—XIII of Fig. 11.

Fig. 14 is a fragmentary, side elevational view of another form of railway skate.

Fig. 15 is a fragmentary, top plan view thereof.

Fig. 16 is a cross-sectional view taken on line XVI—XVI of Fig. 14.

Figure 17:
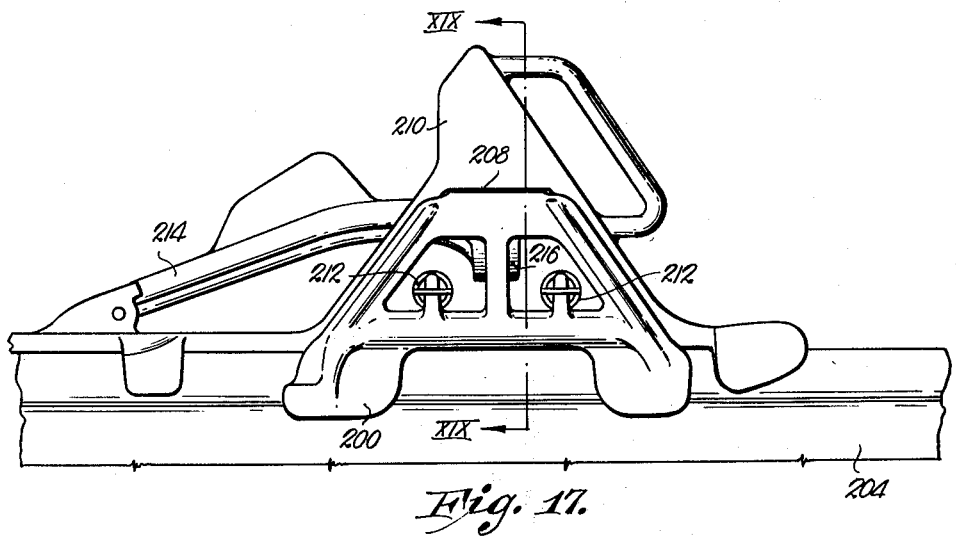
Fig. 17 is a fragmentary, side elevational view of still another embodiment.

This is a continuation-in-part of my copending applications Serial No. 326,725, filed December 18, 1952, now U.S. Patent 2,782,728, and Serial No. 461,489, filed October 11, 1954, now abandoned.

In its simplest form, the universal skate of the subject invention as shown in Figs. 1–3 of the drawings, includes an elongated slide bar 20 adapted to rest upon the uppermost face of rail 22 and to be received by car wheel 24 in the manner illustrated by Fig. 1. Bar 20 is provided with an upstanding abutment 26 at one end thereof and against which the wheel 24 bears during the braking action to the end that the bar 20 slides along the rail 22 without being deflected from beneath the wheel 24. Bar 20 is provided with two pairs of down-turned wings 28 which overlap the sides of the rail 22.

Novel ramp means in the nature of an elongated tongue 30 for receiving the wheel 24, is mounted upon the bar 20 at the opposite end thereof. Bar 20 has an elongated, upstanding lug 32 integral therewith and extending forwardly therefrom, to which the tongue 30 is attached by a pivot pin 34. A clearance slot 36 for the lug 32 is provided in the tongue 30 permitting the latter to swing freely on the pivot 34.

It is important to note that lug 32 extends above the upper surface of the bar 20, substantially flush with the top of tongue 30 when the latter is in the position shown in Fig. 1. Accordingly, when the wheel 24 is resting on the skate, it is cradled between the abutment 26 and the lug 32. Furthermore, the shape and configuration of the tongue 30 is such as illustrated to cause the outermost tapered bit end thereof to be raised out of engagement with the track 22 when the wheel 24 rolls thereupon and swings the innermost end of tongue 30 downwardly against the upper face of the bar 20. Consequently, during sliding movement of the bar 20 along the rail 22, heat produced in the bar 20 is dissipated through ribs 38 integral with the bar 20 and said outermost tapered bit end of tongue 30 is held against sliding along the rail 22.

Prior to movement of the wheel 24 to the position shown in Fig. 1 of the drawings, the outermost tapered end of tongue 30 rests upon the rail 22 by virtue of proper positioning of the center of gravity. It is to be noted additionally in Fig. 1 of the drawings that the upper face of tongue 30 and lug 32, are slightly concave conforming to the peripheral contour of the wheel 24 to more effectively cradle the wheel in the skate and assure that it is supported essentially between lug 32 and the abutment 26 rather than by the tongue 30. Such configuration is incorporated in substantially the same manner in the embodiment of Figs. 11–13 and reference is, therefore, made to lug 106 in Fig. 11 for a better understanding of the nature of lug 32.

The skate illustrated in Figs. 4 to 10 inclusive is likewise provided with a slide bar 50 normally resting upon the uppermost face of a rail 52. Bar 50 has an upstanding abutment 54 at one end thereof and an elongated ramp or tongue 56 provided with an opening 58 for clearing an upstanding lug 60 integral with the bar 50. A pivot pin 62 swingably mounts the tongue 56 on the bar 50.

A pair of opposed primary jaws 64 are mounted on the bar 50 by universal joints 66 for swinging movement not only toward and away from each other, but vertically to a position above the upper face of rail 52 (Fig. 9).

Jaws 64 are held into clamping relationship with the rail 52 when the jaws 64 are in the position shown in Fig. 7 by a spring 68 interconnecting the same and extending through the abutment 54. They are held at the lowermost ends of their paths of travel by notches 70 formed in the abutment 54, and within which the jaws 64 engage. By the same token, when jaws 64 are raised, they releasably engage within notches 72 formed in the abutment 54.

Spreading of the jaws 64 apart is accomplished by downward swinging movement of the tongue 56 on pivot pin 62, it being noted that the inner end of the tongue 56 is provided with a V-shaped spreader head 74 that moves between the jaws 64 in the manner seen best in Figs. 7-9.

The weight of the car wheel 76 on the tongue 56 forces the head 74 to the position shown in Fig. 8, causing the jaws 64 to move apart against the action of spring 68 out of engagement with the rail 52. Manifestly, this also releases the jaws 64 from engagement with notches 70. Consequently, as the skate shown in Figs. 4–10 slides along the rail, either or both of the jaws 64 will swing upwardly when they move into engagement with a frog or other obstacle along the rail 52. At the uppermost ends of their paths of travel, jaws 64 are received by notches 72 and will, therefore, not fall back to the positions shown in Figs. 7 and 8 until the operator re-sets the skate upon the rail in a position for receiving wheel 76.

Secondary jaws 78 are also mounted on the bar 50 by use of universal joints 80, jaws 78 serving to cooperate with jaws 64 in preventing accidental displacement of the skate from the rail 52 by the wheel 76, and while jaws 78 slide along the sides of the rail 52, they are not held in clamping relation therewith and, therefore, not released by the tongue 56. However, they are held against spreading by springs 82 and are adapted to be raised upon engagement with a frog because of the joints 80. Each jaw 78 is interlocked with the bar 50 as at 84 and, therefore, guided in their reciprocable movements. It is seen, therefore, that jaws 64 and 78 are raised only when they engage obstacles along the rail 52 and under certain circumstances, the jaws 64 and 78 along one side only of the rail 52, will be raised during the operation of the skate. Tongue 56 is likewise interlocked with the abutment 54 as at 86 to the end that the innermost end of tongue 56 is guided through the reciprocable movement.

A railroad frog is defined as a device made of rail sections so constructed and assembled as to permit the wheels on one rail of a track to cross another rail of an intersecting track. Manifestly, such construction will not permit jaws 64 and 78 to move along the sides of rail 52 and when the jaws strike the frogs at points of track intersection, the frogs will force the jaws upwardly as above stated.

In the embodiment shown in Figs. 11 to 13, bar 100 is provided with an upstanding abutment 102 at one end thereof and a ramp or tongue 104 at its opposite end. Fig. 11 of the drawings clearly illustrates the type of lug 106 that is contemplated at the present invention for cradling the car wheel by the skate between abutment 102 and lug 106. Abutment 106 swingably mounts the tongue 104 by a pivot pin 108 and heat is dissipated by intermeshing ribs and grooves 110 on the proximal faces of the tongue 104 and the bar 100.

Primary clamping jaws 112 are mounted on the bar 100 by universal joints 114 and yieldably biased toward each other interconnecting spring 116. A head 118 on arm 120 is wedged between the jaws 112 to spread the latter when the weight of the wheel is on the arm 120, the latter being swingably mounted on the bar 100 by pivot pin 122. A stop 124 on the abutment 102 limits the extent of upward swinging movement of the arm 120. Normally, the jaws 112 are locked beneath opposed extensions 126 on the abutment 102, but when the jaws 112 are spread apart by the head 118 and subsequently come into engagement with frogs or other obstacles, jaws 112 move to a position above the extensions 126 over which they lock by the action of spring 116.

Secondary jaws 128 are similar in nature to jaws 78 and are swingably mounted on the bar 100 by universal joints 130. Spring 132 between the jaws 128 maintain the latter in sliding engagement with the sides of the rail 134.

When the jaws 112 and 128 are in the operative position shown in the drawings, they are interlocked as at 136. Accordingly, the jaws 128 are held in the operative position and cannot swing upwardly until after the jaws 112 are spread apart out of interlocking engagement with the proximal ends of the jaws 128.

The ramp or tongue for the skate shown in Figs. 14 to 16 inclusive, is not illustrated and may take the same form as tongue 104. Spreader arm 150 is substantially the same as arm 120 and provided with a spreader head 152 for jaws 154 that are mounted on upstanding pins 156 for horizontal movement toward and away from each other. Spring 158 interconnects the jaws 154 to hold the same against the sides of rail 160. Opposed, lateral extensions 162 on abutment 164 overlie the jaws 154 and hold the same against upward movement.

While the form of the invention shown in Figs. 14–16 is not adapted to clear frogs and other obstacles, the action of the wheel upon the arm 150 is positive and the jaws 154 are opened without any danger of the skate being thrown from the rail 160.

Figure 18:
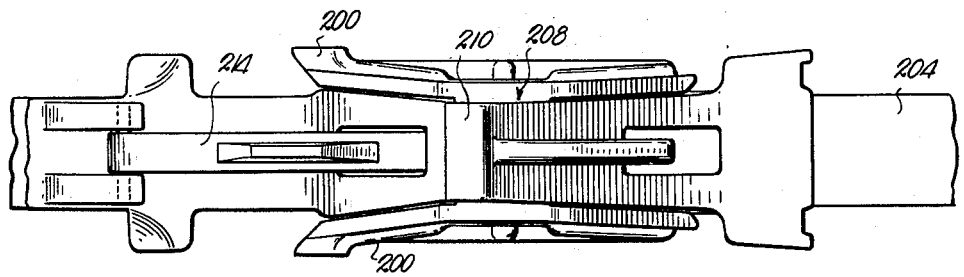
Fig. 18 is a fragmentary, top plan view thereof.
Figure 19:
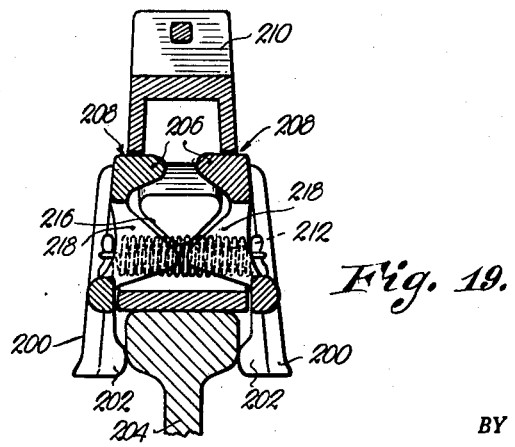
Fig. 19 is a cross-sectional view taken on line XIX—XIX of Fig. 17.

Jaws 200 in Figs. 17–19, are each provided with a pair of ears 202 for engaging the rail 204. Jaws 200 swing on horizontal axes by virtue of being provided with protuberances 206 at the uppermost ends thereof acting as fulcrums within slots 208 formed in abutment 210. Springs 212 yieldably bias the ears 202 against the sides of the rail 204. Arm 214 is essentially the same as arms 120 and 150 except that its spreader head 216 is disposed within the abutment 210 where it will engage between inwardly extending bosses 218 on the jaws 200. The ramp means or tongue for the skate shown in Figs. 17 to 19 inclusive, may be essentially the same as that illustrated in Figs. 11–13.

Having thus described the invention what is claimed as new and desired to be secured by Letters Patent is:

1. In a railway skate, a slide bar adapted to rest upon a rail; an upstanding, wheel-receiving abutment on the bar at one end thereof; a pair of opposed jaws adapted to clamp said rail therebetween; universal joints mounting the jaws on the bar for swinging movement toward and away from each other and vertical swinging movement to a position above the level of the rail; means yieldably holding the jaws against spreading apart away from each other; and means overlying the bar and mounted thereon for downward swinging movement between the jaws to spread the same apart and out of engagement with the rail as the wheel rolls upon said means and against the abutment.

2. In a railway skate, a slide bar adapted to rest upon a rail; an upstanding, wheel-receiving abutment on the bar at one end thereof; a pair of opposed jaws adapted to clamp said rail therebetween; universal joints mounting the jaws on the bar for swinging movement toward and away from each other and vertical swinging movement to a position above the level of the rail; means yieldably holding the jaws against spreading apart away from each other; means overlying the bar and mounted thereon for downward swinging movement between the jaws to spread the same apart and out of engagement with the rail as the wheel rolls upon said means and against the abutment; and means on the abutment for locking the jaws against vertical movement at either end of their vertical paths of travel.

3. In a railway skate, a slide bar adapted to rest upon a rail; an upstanding, wheel-receiving abutment on the bar at one end thereof; a lug on the bar at the opposite end thereof, said lug extending upwardly above the bar for cradling the wheel between the lug and the abutment when the wheel is on the bar; ramp means mounted on the bar at said opposite end thereof for receiving the wheel as it rolls upon the bar; and opposed jaws mounted adjacent the abutment for swinging movement to and from a position clamping the rail therebetween; means yieldably holding the jaws against spreading apart away from each other, said ramp means overlying the bar and mounted thereon for downward swinging movement between the jaws to spread the same apart and out of engagement with the rail as the wheel rolls upon said ramp means and against the abutment.

4. In a railway skate, a slide bar adapted to rest upon a rail; an upstanding, wheel-receiving abutment on the bar at one end thereof; a longitudinally-disposed lug integral with the bar at the opposite end thereof; an elongated tongue normally resting upon the bar and extending forwardly beyond the lug and upwardly in spaced relationship to said rail, said tongue having a lug-clearing opening; means pivotally mounting the tongue on the bar for swinging movement toward and away from the rail, said lug extending upwardly above the bar for cradling the wheel between the lug and the abutment when the wheel is on the tongue; and interengaging parts on the tongue and on the bar for limiting the extent of movement of the tongue relative to the bar when the wheel is on the tongue.

5. In a railway skate, a slide bar adapted to rest upon a rail; an upstanding, wheel-receiving abutment on the bar at one end thereof; a pair of opposed jaws adapted to clamp said rail therebetween; universal joints mounting the jaws on the bar for swinging movement toward and away from each other and vertical swinging movement to a position above the level of the rail; means yieldably holding the jaws against spreading apart away from each other; means overlying the bar and mounted thereon for downward swinging movement between the jaws to spread the same apart and out of engagement with the rail as the wheel rolls upon said means and against the abutment; a pair of secondary jaws mounted on the bar in spaced relationship to said first mentioned jaws and normally overlapping the sides of the rails; means mounting the secondary jaws for vertical swinging movement to a position above the level of the rail; and means interlocking the first-mentioned jaws with the secondary jaws when the same are at the lowermost ends of their paths of vertical movement.

6. In a railway skate, a slide bar adapted to rest upon a rail; an upstanding, wheel-receiving abutment on the bar at one end thereof; opposed jaws mounted adjacent the abutment for swinging movement to and from a position clamping the rail therebetween; means yieldably holding the jaws against spreading apart away from each other; means overlying the bar and mounted thereon for downward swinging movement between the jaws to spread the same apart and out of engagement with the rail as the wheel rolls upon said means and against the abutment; and means extending outwardly from the abutment in overlying relationship to the jaws for holding the latter against upward movement relative to the bar.

7. In a railway skate, a slide bar adapted to rest upon a rail; an upstanding, wheel-receiving abutment on the bar at one end thereof; opposed jaws pivotally mounted on the bar adjacent the abutment thereof for swinging movement to and from a position clamping the rail therebetween, said jaws having opposed, normally proximally disposed cam surfaces; means yieldably holding the jaws against spreading apart away from each other; and elongated arm means pivotally mounted on the bar in overlying relationship and having a cam head on one end thereof disposed to engage said cam surfaces of the jaws to spread the latter when the arm means is swung downwardly, the portion of said arm means between said cam head and the axis of pivoting thereof being disposed to be engaged and swung downwardly by the wheel as the same rolls onto the bar and against said abutment to thereby move the jaws out of engagement with said rail, the end of said arm means on the side of the axis of pivoting thereof opposite to said cam head extending outwardly from the opposite end of said bar to prevent a tongue adapted for guiding the wheel onto said bar, there being a lug extending upwardly from the bar at said opposite end thereof, in sufficiently spaced relationship to said abutment and cooperable with said arm means in cradling the wheel between the lug and said abutment while the wheel is on said bar.

References Cited in the file of this patent

UNITED STATES PATENTS

| | | |
|---|---|---|
| 519,624 | Barthelmess | May 8, 1894 |
| 1,081,208 | Carduck et al. | Dec. 9, 1913 |
| 1,379,398 | Duffy | May 24, 1921 |
| 1,385,528 | Duffy | July 26, 1921 |
| 1,522,403 | Wood | Jan. 6, 1925 |
| 2,002,217 | Bone | May 21, 1935 |
| 2,170,523 | Wilcox | Aug. 22, 1939 |
| 2,782,728 | Beck | Feb. 26, 1957 |

FOREIGN PATENTS

| | | |
|---|---|---|
| 565,568 | France | Nov. 8, 1923 |
| 46,972 | Germany | Apr. 18, 1889 |
| 73,166 | Germany | Jan. 16, 1894 |
| 507,230 | Germany | Sept. 13, 1930 |